United States Patent [19]

Larson et al.

[11] Patent Number: 5,740,846
[45] Date of Patent: Apr. 21, 1998

[54] HOSE ADAPTER FOR USE IN CONNECTING A PRECONDITIONED AIR HOSE TO AN AIRCRAFT

[76] Inventors: L. Robert Larson, 312 Herricks Rd., Mineola, N.Y. 11501; D. Jonathon Carmody, 78 Mineola Ave., Point Lookout, N.Y. 11569

[21] Appl. No.: 729,983

[22] Filed: Oct. 11, 1996

[51] Int. Cl.$^6$ ............................................. B65B 1/04
[52] U.S. Cl. ...................... 141/382; 141/113; 141/389; 244/118.5
[58] Field of Search .................. 141/113, 382, 141/383, 385, 386, 387, 389; 244/118.5; 285/308, 317; 193/3

[56] References Cited

U.S. PATENT DOCUMENTS

| | | | |
|---|---|---|---|
| 953,061 | 3/1910 | Ruland | 285/317 |
| 2,951,714 | 9/1960 | Carlberg | 285/317 |
| 3,041,089 | 6/1962 | Purves | 285/317 |
| 3,700,112 | 10/1972 | Maeshiba | 285/317 |
| 5,301,723 | 4/1994 | Goode | 141/382 |
| 5,355,917 | 10/1994 | Kofflin | 141/384 |
| 5,368,341 | 11/1994 | Larson | 285/260 |

*Primary Examiner*—Henry J. Recla
*Assistant Examiner*—Steven O. Douglas
*Attorney, Agent, or Firm*—Galgano & Burke

[57] ABSTRACT

A hose adapter for use in connecting a preconditioned air hose to an aircraft having a ring connector with a plurality of slots formed therethrough by which a ground-based heating/air conditioning unit is connected to an internal ventilation system of the aircraft. The hose adapter includes a generally hollow housing and slot-engaging arms which connect the housing to a ring connector in a snap-fit manner. The housing includes a lower end having an inlet which is connectable to a preconditioned air hose, and an upper end having an outlet which is connectable to a ring connector of an aircraft. The slot-engaging arms are biased toward a locking position wherein the slot-engaging arms provide a quick connect to a ring connector and an unbiased position wherein the slot-engaging arms releasably disconnect from the ring connector.

11 Claims, 5 Drawing Sheets

HOSE ADAPTER FOR USE IN CONNECTING A PRECONDITIONED AIR HOSE TO AN AIRCRAFT

BACKGROUND OF THE INVENTION

The present invention relates generally to hose adapters. More specifically, the present invention relates to self-locking, quick-disconnect, hose adapters for use in connecting a preconditioned air hose to an aircraft.

During the time that an aircraft is at a terminal awaiting boarding of passengers, and while the engines are off, preconditioned air is blown into the aircraft from a ground based heating or air conditioning system. As shown in FIG. 1, this is done through the use of an insulated flexible preconditioned air hose or tube 10 disposed along the ground 12 which connects a heating or air conditioning unit 14 with the internal ventilation system of an aircraft 16. A suitable preconditioned air hose is disclosed in U.S. Pat. No. 5,368,341 to Larson, a co-inventor of the present invention.

More particularly, FIG. 1 illustrates a prior art hose adapter 20 which attaches at a lower end to preconditioned air hose 10 and at an upper end to aircraft 16. Specifically, hose adapter 20 which is illustrated in FIG. 2 and disclosed in U.S. Pat. No. 5,355,917 to Kofflin, comprises a generally hollow cylindrical body 22 having a lower end 24 which is connectable to a preconditioned air hose and an upper end 26 having a outwardly extending flange 28 which is connectable to an aircraft. A pair of handles 21 (one being shown) extend radially outward from opposite sides of body 22. Attached to each handle 21 is a clamp 30 which is connected to a rod 32 which is connected to an L-shaped member 34. L-shaped member 34 includes a horizontally disposed leg 33 and a vertically disposed leg 35 which extends above and through a cutout in flange 28. In particular, L-shaped member 34 is structured and disposed so as to connect to a conventional one-piece ring connector, attached to an aircraft typically along the bottom thereof recessed within an access door, and which connects to the internal ventilation system of the aircraft.

As best seen in FIG. 3, a conventional ring connector 40, commonly called a "mylo-connector," comprises a ring 42 having an eight-inch diameter opening. Ring 42 is approximately one-inch wide and typically includes from two to twelve slots 44 (six being shown) uniformly spaced around the bottom of ring connector 40. Slots 44 are generally one and one-half inches long.

With reference to FIGS. 1–3, hose adapter 20 is connected to aircraft 16 by placing upper end 26 of hose adapter 20 adjacent ring connector 40 with L-shaped members 34 in vertical alignment with two opposite slots 44 of ring connector 40. Hose adapter 20 is then moved upward so that horizontal legs 33 of L-shaped members 34 are inserted into slots 44 in ring connector 40 upon which hose adapter 20 is then rotated in the direction of arrow A in FIG. 2 so that a portion of horizontal legs 33 are positioned behind a rear surface of ring connector 40 adjacent slots 44. Clamps 30 are operated via lever 36 to clamp ring connecter 40 between flange 28 and L-shaped members 34.

Drawbacks with this prior art hose adapter, and other prior art hose adapters which use L-shaped members which are activated to clampingly engage a ring connector of an aircraft is that the L-shaped members easily bend and jam when connecting and disconnecting the hose adapter to a ring connector. This can contribute to aircraft departure delays and damage the ring connector. Moreover, should a ring connector become damaged, it is quite expensive to replace, e.g., ring connectors typically cost eight hundred dollars each, exclusive of the labor installation costs, and the aircraft must also be temporarily out of service.

Thus, there is a need for reliable self-locking, quick-disconnect, hose adapters for use in readily connecting and disconnecting a preconditioned air hose to an aircraft and which overcomes the above-noted drawbacks.

SUMMARY OF THE INVENTION

Accordingly, it is an object of the present invention to provide novel hose adapters for use in connecting a preconditioned air hose to an aircraft in which the hose adapters quickly and easily connect in a snap-fit manner to a ring connector of an aircraft.

It is another object of the present invention to provide novel hose adapters for use in connecting a preconditioned air hose to an aircraft in which the hose adapters need not be rotated nor handles or levers operated to clampingly engage L-shaped members with a ring connector in order to secure the hose adapter to a ring connector of aircraft.

It is still another object of the present invention to provide such novel hose adapters which allow easy and facile disconnection of the adapter from a ring connector by simply applying hand pressure to the locking arms on the hose adapter.

It is a further object of the present invention to provide novel hose adapters having the foregoing attributes and characteristics which may be inexpensively manufactured for widespread use, are suitable for replacement of existing prior art hose adapters, and which reduce the likelihood that aircraft will be delayed at the terminal due to a hose adapter jamming and failing to connect or disconnect from an aircraft.

Certain of the foregoing and related objects are readily attained in the present invention which provides hose adapters for use in connecting a preconditioned air hose to an aircraft having a ring connector with a plurality of slots formed therethrough by which a ground-based heating/air conditioning unit is connected to an internal ventilation system of the aircraft, and in particular hose adapters which comprise a generally hollow housing and self-locking means.

The housing has an lower end defining an inlet and a upper end defining an outlet. The lower end is connectable to a preconditioned air hose, and the upper end is connectable to a ring connector of an aircraft. The self-locking means releasably connect via the slots in the ring connector the upper end of the housing to the ring connector in a snap-fit manner, in which the self-locking means is movable between a normally biased locking position, in which the self-locking means connects the hose adapter to a ring connector in a quick-connect, snap-fit manner, and a release position, in which the self-locking means disconnects from the ring connector in a quick disconnect manner.

Preferably, the self-locking means comprises a pair of slot-engaging arms which connect to the slots in a ring connector in which the slot-engaging arms each have a handle-like lower end which serves as a disconnect handle and an hook-like upper end dimensioned and configured to extend through a slot of the ring connector. The hook-like upper end is wedge-shaped having an angled camming surface which terminates at its free end in a thin-edged tip and which merges at a lower end with a recessed undercut lower catch surface.

Also preferably, the slot-engaging arms are pivotally attached to the housing about a midpoint thereof via a pin.

Desirably, the self-locking means comprises at least one spring which is disposed between the housing and the lower end of one slot-engaging arm.

Advantageously, the housing is generally cylindrically shaped and the upper end includes a radially outward extending rim. Desirably, a resilient gasket fabricated from a foam rubber is disposed on the rim for forming an air-tight seal between the rim and the ring connector when said housing is connected to the ring connector. Most advantageously, the upper end of the housing includes an upwardly extending, conically tapered, guide for axially aligning the upper end of the hose adapter when connecting the hose adapter to a ring connector.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
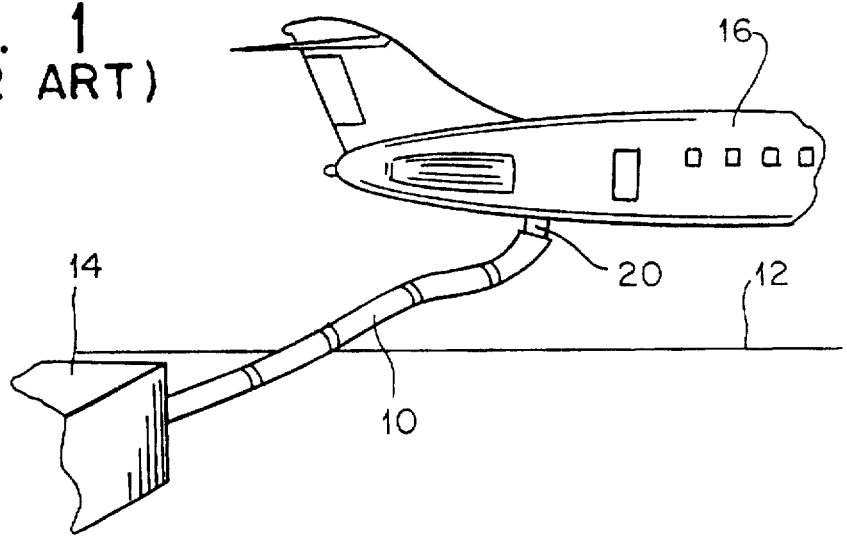
FIG. 1 is a perspective view of an aircraft connected to a heating/air conditioning unit via a preconditioned air hose and prior art hose adapter.
Figure 3:
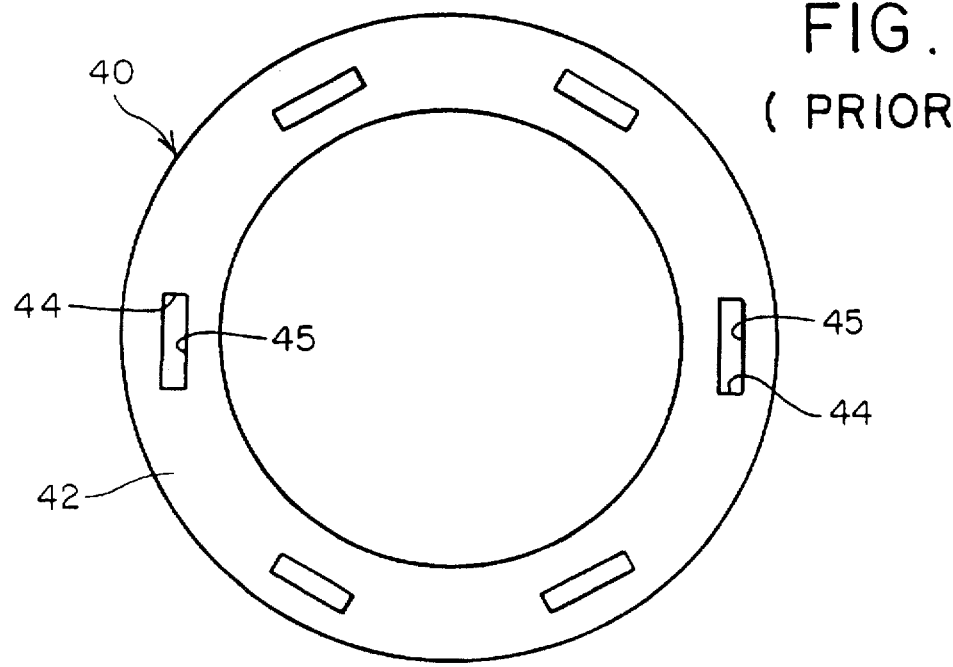
FIG. 3 is a bottom view of a conventional ring connector normally recessed within an access door on a bottom surface of an aircraft shown in FIG. 1.
Figure 2:
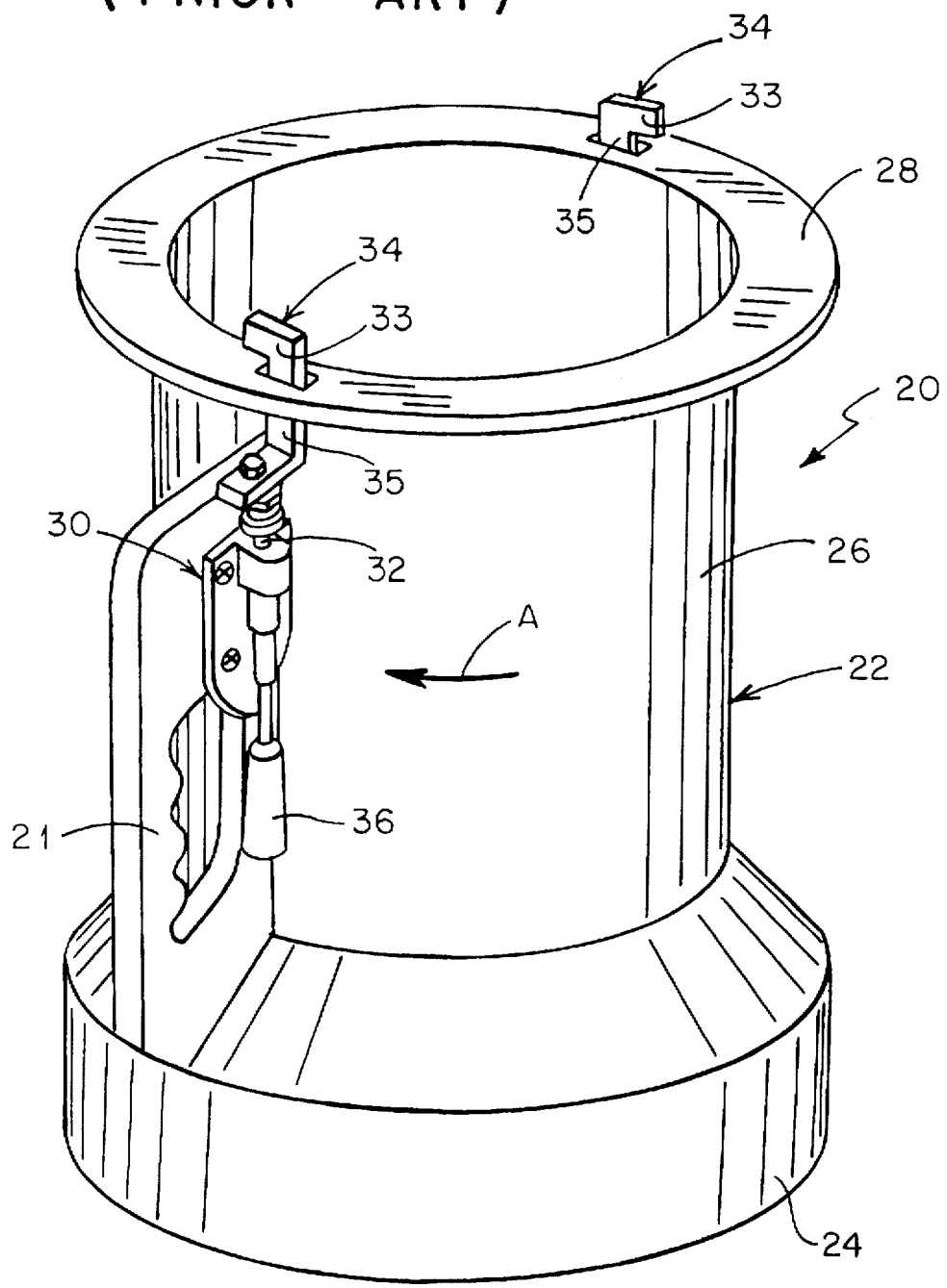
FIG. 2 is a perspective view of the prior art hose adapter shown in FIG. 1.
Figure 4:
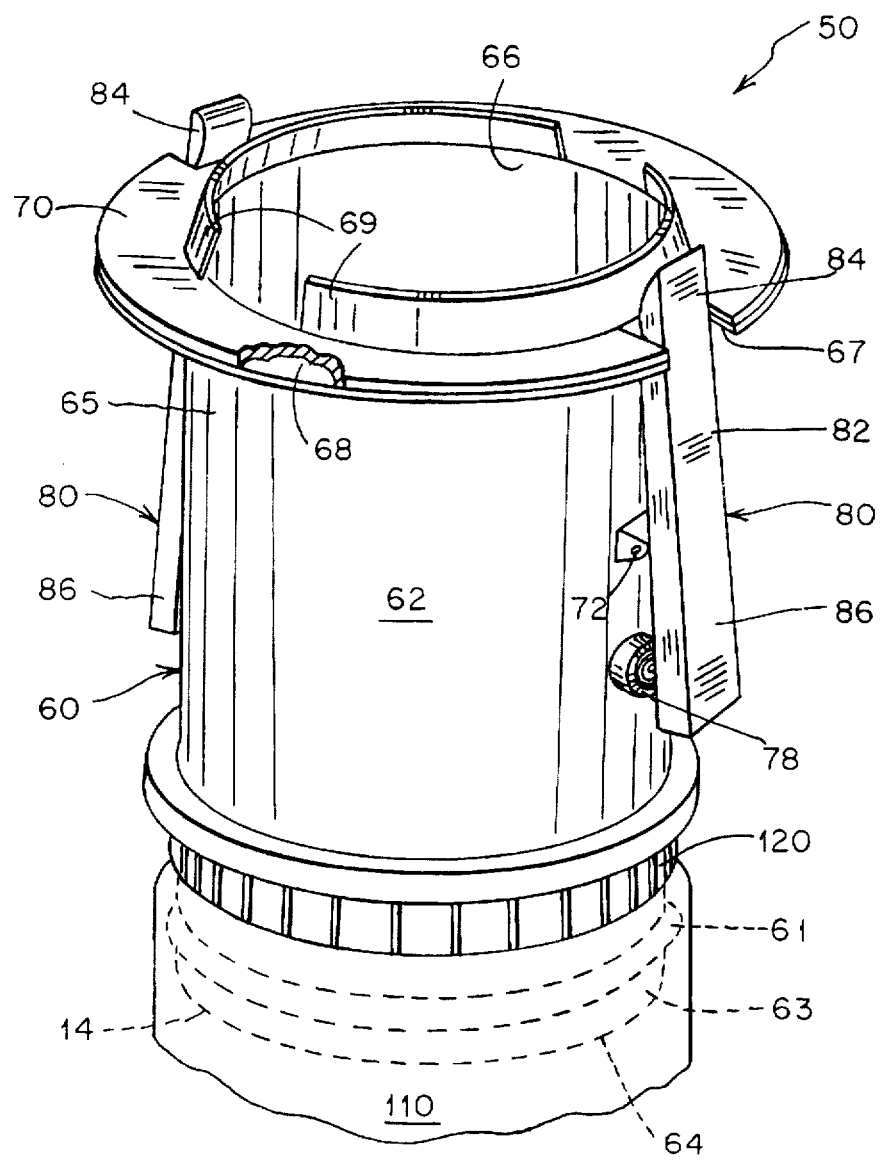
FIG. 4 is a perspective view of a preferred embodiment of the present invention for a self-locking, quick disconnect, hose adapter.

Turning now in detail to the drawings and, in particular to FIG. 4 thereof, therein illustrated is a preferred embodiment of a novel self-locking, quick disconnect, hose adapter 50 embodying the present invention for use in readily connecting in a snap-fit manner preconditioned air hose 110 to ring connector 40 (FIG. 3) of an aircraft. A preconditioned air hose suitable for use with the present invention is disclosed in U.S. Pat. No. 5,368,341 to Larson, the subject matter of which is incorporated herein by reference thereto.

Hose adapter 50 includes a generally hollow cylindrically shaped housing 60, and self-locking means 80. Housing 60 includes a sidewall 62 having a lower end 63 defining an inlet 64 and an upper end 65 defining an outlet 66. Inlet 64 is connectable to preconditioned air hose 110, e.g., lower end 63 is insertable into preconditioned air hose 110 which is fastened to lower end 63 with a hose clamp 120.

Desirably, a bead 61 extends circumferentially around lower end 63 to form a collar to better secure preconditioned air hose 110 to lower end 63.

Upper end 65 is generally sized and configured for sealably engaging ring connector 40 (FIG. 3). Specifically, upper end 65 includes a radially outward extending flange or rim 68 and an upwardly extending conically tapered or frustoconical slotted nose guide 69 for aiding the axial alignment of hose adapter 50 with ring connector 40 (FIG. 3) during connection thereto. In particular, guide 69 centers upper end 65 with the opening in ring connector 40. Also, disposed on the top surface of rim 68 is a resilient gasket 70 for forming an air-tight seal between ring connector 40 and rim 68 to prevent the escape of heated or air conditioned air. Desirably, resilient gasket 70 is fabricated out of a compressible foam rubber material.

Figure 5:
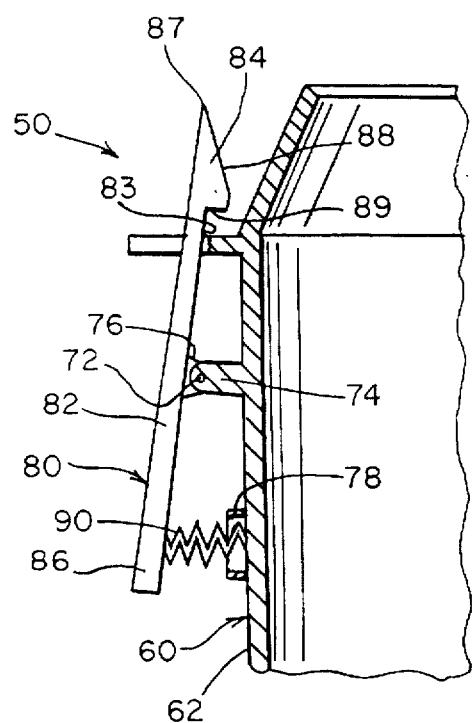
FIG. 5 is an enlarged elevational view, in part cross-section, of a portion of the self-locking means of the hose adapter shown in FIG. 4.

Self-locking means 80 is attached to housing 60 and, as will be discussed below, releasably connects outlet 66 to ring connector 40 (FIG. 3) in a snap-fit manner. As shown in FIGS. 4 and 5, self-locking means 80 includes a pair of elongated slot-engaging arms 82 disposed on opposite sides of housing 60. Arms 82 include a hook-, barb- or arrowhead-like upper end 84 which extends through a cutout 67 in flange 68 and is sized for insertion into a slot 44 of ring connector 40 (FIG. 3) so that it may function as a pawl-type spring catch. Each of slot-engaging arms 82 also includes a hand-engageable lower end 86 for facilitating easy and facile release of the self-locking means.

As shown in FIG. 5, slot-engaging arms 82 pivotally attach to housing 60 about a midpoint thereof via pin 72. In particular, housing 60 includes a stanchion 74 which extends radially outward from sidewall 62 and which pivotally attaches to a pair of wings 76 (one being shown) which extend radially inward from slot-engaging arm 82.

A spring 90 extends between lower end 86 and housing 60 to bias lower end 86 of slot-engaging arm 82 radially away from housing 60, and in doing so, biases hook-like upper end 84 radially inward, i.e., a normally biased locking position. A cylindrical retainer 78 is welded to sidewall 62 which retains and guides spring 90 between an extended position and a compressed position.

Hook-like upper end 84 is generally wedge-shaped and includes an angled or camming surface 88 which terminates at an upper end in a thin edged tip 87. Camming surface 88 merges at a lower end with an undercut, recessed retaining land or catch surface 89.

Figure 6:
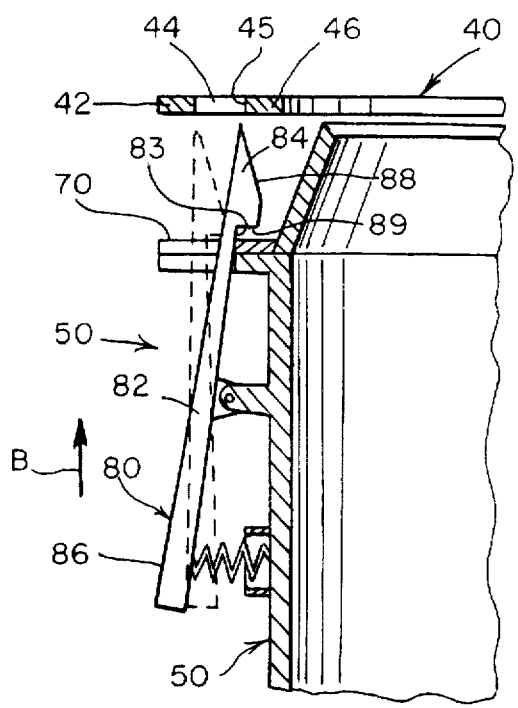
FIGS. 6 and 7 are enlarged elevational view, in part cross-section, of the housing and self-locking means of the hose adapter shown in FIG. 5 sequentially illustrating the attachment of the hose adapter to a ring connector.
Figure 7:
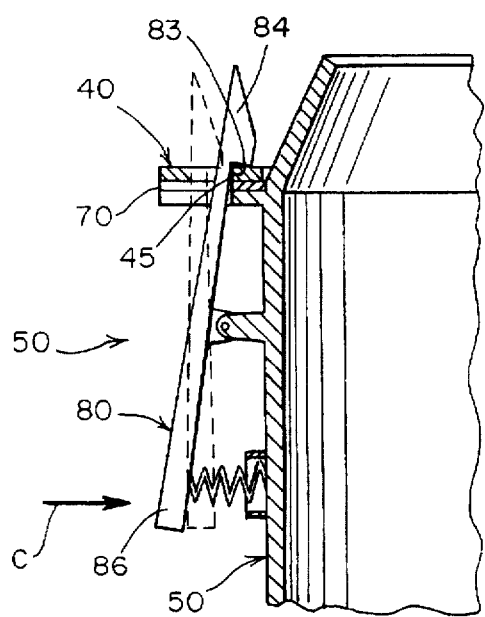

FIGS. 6 and 7 illustrate the attachment of hose adapter 50 to ring connector 40. Specifically, hose adapter 50 is aligned with hook-like upper ends 84 of slot-engaging arms 82 aligned with slots 44 of ring connector 30. Once aligned, as shown in FIG. 6, housing 60 is moved upwardly in the direction of arrow B so that hook-like upper end 84 engages and extends into slot 44 of ring connector 40. In particular, camming surface 88 guides hook-like upper end 84 of slot-engaging arm 82 into slot 44, i.e., hook-like upper end 84 locates itself by riding over a radially inward edge 45 of slot 44, which deflects hook-like upper end 84 radially outward to the position shown in dashed lines. As housing 60 is moved further upward toward ring connector 40, hook-like upper end 84 will fully extend and pass through slot 44. At this point, catch surface 89 will be biased radially inward to a locking position behind an inner radial rear surface 46 of ring 32 and a neck-like inner portion 83 of slot-engaging arm 82 immediately below catch surface 89 is biasely urged against the inner edge 45 of slot 44 as shown in FIG. 7 to lock hose adapter 50 on ring 30 in a snap-fit manner. As can be appreciated, the radially-inward normal biasing of the slot-engaging arms 82, i.e., the pawl-like upper ends 84, will maintain hose adapter 50 in this self-locking position due to the spring biasing thereof.

To remove hose adapter 50 from ring connector 40, an inwardly directed force is applied in the direction of arrow C so that slot-engaging arm 82 is disposed in an unbiased position shown in dashed lines upon which hose adapter 50 can be easily lowered to remove hook-like upper ends 84 from ring connector 40. In particular, the handle-like lower ends 86 of arms 82 are simply grasped by the operator who then applies manual hand pressure to the lower ends 86, thereby pivoting upper ends 84 to their release position, upon which hose adapter 50 can be lowered and the pawl-like upper ends 84 can be removed from slots 44.

Figure 8:
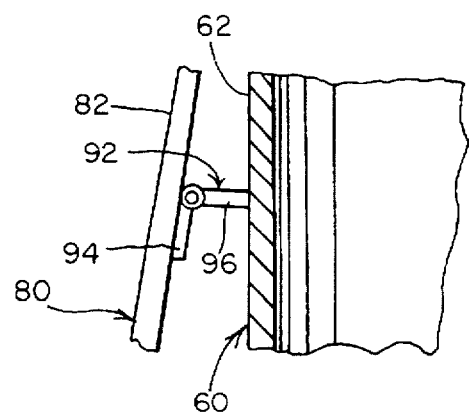
FIG. 8 is an alternative embodiment of the pivotal attachment of the self-locking means to the housing of the hose adapter shown in FIG. 4.

An alternative embodiment for attaching slot-engaging arms to a housing is shown in FIG. 8. In particular, slot-engaging arms 82 are hingedly connected to housing 60 via a hinge 92. Specifically, a first leaf 94 is attached to slot-engaging arm 82 and a second leaf 96 is attached perpendicularly to sidewall 62 of housing 60.

From the present description it will be appreciated to those skilled in the art that self-locking means 80 need not include two springs 90 for effectively biasing slot-engaging arms so as connect to ring connector 40 in a snap-fit manner. For example, it may be possible to attach one of the slot-engaging arms to a housing in a generally vertical fixed position for engaging a slot of a ring connector while an opposite slot-engaging arm is operatively biased as described above for engaging a second slot of a ring connector, i.e., a clamping force may still be maintained between the hook-like upper ends of the slot-engaging arms. Moreover, it may be possible to provide other positive locking and quick release type mechanisms for the self-locking means in place of slot-engaging arms 82, e.g., spring-loaded detents. Another possible suitable example is an upwardly extending spring hook having a generally U-shaped spring with one leg which attaches to the housing and the other leg which is provided with a catch which releasably locks onto a ring connector via slots therein.

Housing 60 may be fabricated from a metallic material such as steel or aluminum, or from a plastic material. Further, it may be desirable for slot-engaging arms to be fabricated from a material which is relatively softer than the material from which the ring connector is fabricated as it is more desirable to replace the slot-engaging arms compared to a ring connector which is secured to an aircraft.

Accordingly, while only several embodiments of the present invention has been shown and described, it is to be understood that many changes and modifications may be made thereunto without departing from the spirit and scope of the invention as disclosed herein.

What is claimed:

1. A hose adapter for use in connecting a preconditioned air hose to an aircraft having a ring connector with a plurality of slots formed therethrough by which a ground-based heating/air conditioning unit is connected to an internal ventilation system of the aircraft, said hose adapter comprising:

a generally hollow housing having a lower end defining an inlet and an upper end defining an outlet, said lower end being connectable to a preconditioned air hose, and said upper end being connectable to a ring connector of an aircraft; and a plurality of self-locking means for releasably connecting via a plurality of slots in the ring connector said upper end of said housing to the ring connector in a snap-fit manner, each of said self-locking means comprising a slot engaging arm having a hand-engageable lower end, said self-locking means being movable between a normally biased locking position, in which said self-locking means connects said hose adapter to the ring connector in a quick-connect, snap-fit manner, and a release position, in which said self-locking means disconnects from the ring connector in a quick disconnect manner, movement of said self-locking means from said locking position to said release position being effected via manual application of a generally radially directed force on said hand-engageable lower end.

2. The hose adapter according to claim 1, wherein said slot-engaging arm comprises a hook-like upper end dimensioned and configured to extend through one of the plurality of slots of the ring connector.

3. The hose adapter according to claim 2, wherein said hook-like upper end is wedge-shaped and has an angled camming surface which terminates at an upper end in a thin-edged tip and which merges at a lower end with a recessed, undercut lower catch surface.

4. The hose adapter according to claim 1, wherein said plurality of slot-engaging arms are pivotally attached to said housing.

5. The hose adapter according to claim 4, wherein said plurality of slot-engaging arms are pivotally attached to said housing about a midpoint thereof via a pin.

6. The hose adapter according to claim 4, wherein said plurality of self-locking means comprise at least one spring, said at least one spring being disposed between said housing and said lower end of one slot-engaging arm.

7. The hose adapter according to claim 1, wherein said housing is generally cylindrically shaped.

8. The hose adapter according to claim 7, wherein said upper end of said housing includes a radially outward extending rim.

9. The hose adapter according to claim 8, further including a resilient gasket disposed on said rim for forming an air-tight seal between said rim and the ring connector when said housing is connected to the ring connector.

10. The hose adapter according to claim 9, wherein said resilient gasket is fabricated from a foam rubber.

11. The hose adapter according to claim 1, wherein said upper end of said housing includes an upwardly extending, conically tapered, guide for axially aligning said upper end of said hose adapter when connecting said hose adapter to the ring connector.

* * * * *